United States Patent [19]

Waschura et al.

[11] Patent Number: 5,414,713
[45] Date of Patent: May 9, 1995

[54] APPARATUS FOR TESTING DIGITAL ELECTRONIC CHANNELS

[75] Inventors: Thomas E. Waschura, Mountain View; James R. Waschura, Palo Alto, both of Calif.

[73] Assignee: Synthesis Research, Inc.

[21] Appl. No.: 475,336

[22] Filed: Feb. 5, 1990

[51] Int. Cl.$^6$ .......................................... H04L 12/26
[52] U.S. Cl. .................................. 371/20.4; 371/29.1
[58] Field of Search ................. 371/5.1, 20.1, 20.4, 371/27, 29.1

[56] References Cited

U.S. PATENT DOCUMENTS

| | | | |
|---|---|---|---|
| 3,351,905 | 11/1967 | Kramer | 340/146.1 |
| 3,445,811 | 5/1969 | Hashimoto et al. | 340/146.1 |
| 3,460,109 | 8/1969 | Veneziano | 340/170 |
| 3,474,331 | 10/1969 | Chur | 324/34 |
| 3,496,536 | 5/1970 | Wheller et al. | 340/146.1. |
| 3,517,305 | 6/1970 | Schwartz et al. | 324/34 |
| 3,755,731 | 8/1973 | Young | 324/34 TA |
| 3,832,535 | 8/1974 | De Vito | 235/153 AC |
| 3,910,322 | 10/1975 | Hardesty, Jr. et al. | 340/172.5 |
| 4,074,201 | 2/1978 | Lennon | 325/363 |
| 4,255,807 | 3/1981 | Cosby | 371/21.1 |
| 4,380,068 | 4/1983 | de Couasnon | 371/24 |
| 4,510,572 | 4/1985 | Reece et al. | 364/481 |
| 4,545,055 | 10/1985 | Patel | 371/55 |
| 4,636,717 | 1/1987 | Sharrit et al. | 324/77 B |
| 4,641,086 | 2/1987 | Barr, IV et al. | 324/77 R |
| 4,661,767 | 4/1987 | Sharrit et al. | 324/57 |
| 4,703,433 | 10/1987 | Sharrit | 364/485 |
| 4,733,395 | 3/1988 | Gelbrich et al. | 371/27 |
| 4,750,181 | 6/1988 | McDonald et al. | 371/71 |
| 4,967,412 | 10/1990 | Cain et al. | 371/20.1 |

OTHER PUBLICATIONS

Magill, J., et al., "Fast data-comm controller speaks to all protocols over two sets of channels", *Electronic Design*, Jan. 24, 1985, pp. 157–168.
Harold, P., "Bit-error-rate testers troubleshoot data links in real time", *EDN*, Feb. 5, 1987, pp. 69–78.
First Marconi promotional literature, dated Mar. 1986.
Second Marconi 2871 promotional literature.
Fireberd 6000 promotional literature.
Phoenix Model 5500A promotional literature.

*Primary Examiner*—Stephen M. Baker
*Attorney, Agent, or Firm*—Douglas A. Chaikin

[57] ABSTRACT

Disclosed herein is an apparatus for testing a digital device. The apparatus includes a generator adapted for connection to the device under test for generating a controlled data stream in words. The generator transmits the controlled data stream to the device which in turn transmits the controlled data stream to a detector. The detector is adapted for connection to the device and receives the controlled data stream. The detector compares the controlled data stream to an expected result and identifies each unexpected result as an error event. The apparatus includes a computer which records the location information of each error event and performs statistical and distribution analysis to allow a user to obtain through high resolution graphical display information used to diagnose the performance of the tested device. The computer controls the input and output of data from the device under test. The computer includes a data bus for enabling communication between the computer and the generator and for enabling communication between the computer and the detector.

20 Claims, 9 Drawing Sheets

APPARATUS FOR TESTING DIGITAL ELECTRONIC CHANNELS

BACKGROUND OF THE INVENTION

1. Field of the Invention

This invention relates to devices for testing electronic channels more particularly to devices for testing digital electronic channels.

2. Previous Art

For as long as there have been digital electronic devices, there has been a need for devices to test them. It is of particular importance in the area of digital electronic devices because the functions performed by these devices are incredibly specific and the digital device must perform with an extremely high degree of accuracy. For the purposes of this patent application, it will be assumed that all digital electronic devices have at least one digital electronic channel and it is in actual point of fact that the channel is what is tested by the testing equipment.

Traditionally, a digital channel is tested by transmitting a known data sequence through the digital channel and then comparing the known sequence with the data after it goes through the channel for errors. Representative of this type of testing device are the testing devices made by Tau-tron, Hewlett-Packard and Anritsu Bit Error Test Sets.

More advanced devices such as de Couasnon, U.S. Pat. No. 4,380,068 (the entire disclosure of which is specifically incorporated herein by reference), and Ampex's Bert Rack have been developed for internal company usage for specific applications and are not suitable for general testing. All these devices create a pattern which is then fed through the device under test and then the device under test is connected to a detector member which compares the known pattern to the pattern after it has been through the device under test. The detector member counts any deviation from the expected result as an error.

As with de Couasnon, U.S. Pat. No. 4,380,068, prior devices compare each bit in a serial fashion. For modern digital channels, this requires the testing device to perform at a very high rate of speed to enable the data to be analyzed. While devices such as de Couasnon, U.S. Pat. No. 4,380,068, are highly useful for showing the total number of error in the data stream (bit error rate also referred to as BER), such information does not give error location or allow grouping of error data for graphical analysis. Thus, the diagnosis of the machine is left in question. Additionally, the expense of adapting a device such as de Couasnon, U.S. Pat. No. 4,380,068, which processes data at modern serial bit rates, makes such a device uneconomical and impractical for many applications.

Prior devices such as the Tau-tron BERTS-350C and BERTS-650, the HP 3784A, 3788A, 3780A and 3764A, Anritsu ME643A and M448A and M448B, and Wandel & Goltermann PF3 and PF4 give test results informing the user the total error rate of their machines. This single result does not assist the user in diagnosing the cause of the errors. The BER would be the same whether the errors were spaced apart evenly or occurred in blocks. However, a machine malfunction causes errors to occur in blocks. Using currently existing testing there is no difference between block errors and those which are evenly spaced apart. Thus, it would be a great diagnostic advantage to have more detailed information to discern the difference between such error types.

Additionally, prior devices do not provide users with graphical analysis of the errors and can not because they lack a high speed interface to a computer and a graphic display.

Many of the testing devices such the Tau-tron BERTS-350C and BERTS-650, the HP 3784A, 3788A, 3780A and 3764A, Anritsu ME643A and M448A and M448B, and Wandel & Goltermann PF3 and PF4 are quite large and expensive. Thus, the above devices lack the ability to be easily transported.

What is needed is a device which performs accurately and reliably and may be used with a wide variety of different digital electronic devices. Additionally, the new device should be able to work effectively and deliver graphical analysis to the user so that the user can instantaneously determine error patterns within his tested device. Additionally, the new device should be adapted such that it can do all the above with the power and size of a personal computer based on standard computer parts, such as Intel's 80386 chip so as to minimize costs and allow for portability. Finally, the ideal device should provide compatibility for error information to be interchanged with other computers for even further user specific analysis.

SUMMARY OF THE INVENTION

It is an object of this invention to provide an apparatus for testing digital electronic devices which yield test results useful in diagnosing the device under test.

It is a further object of this invention to provide an apparatus which can identify and count errors in the tested device and communicate the location of those errors.

It is a further object of this invention to provide an apparatus as set forth above which can be connected with a device that operates in either a serial or parallel fashion.

In accordance with the above objects and those that have been mentioned and those that will be mentioned and will become apparent below, one embodiment of the instant invention is an apparatus for testing digital electronic channels, comprising:

detector means for receiving a data stream from the electronic channel under test in words, the detector means including means for comparing the data stream from the channel under test to an expected result and identifying and locating errors in the data stream and means for transmitting error location information; and computer means for performing analysis on the error data detected by the detector means and the computer means including means for receiving the error location information and a data bus for enabling communication and control between the computer means and the detector means, whereby error location information can be recorded and addressed for analysis.

The above described apparatus is for use with the testing of devices which communicate their data in a parallel fashion. The invention further includes an apparatus for testing devices which pass data in either a parallel or serial fashion. Such an apparatus comprises:

detector means for receiving a data stream from the electronic channel under test in words, the detector means including:

means for converting a serial data stream from the channel under test to parallel; and means for comparing the data stream from the channel under test to an expected result and identifying and locating errors in the data stream and means for transmitting error location information; and computer means for performing analysis on the error data detected by the detector means and the computer means including means for receiving the error location information and a data bus for enabling communication and control between the computer means and the detector means, whereby error location information can be recorded and addressed for analysis.

An additional embodiment of the invention includes the same basic apparatus as described above with the addition of a generator to create a controlled data stream. An apparatus in accordance with that embodiment, comprises:

generator means adapted for connection to the channel under test for generating a controlled data stream and means for generating the controlled data stream in words and for transmitting the controlled data stream to the channel under test;

detector means adapted for connection to the channel under test for identifying and locating errors in the controlled data stream by comparing the controlled data stream to an expected result, wherein the unexpected results are defined as errors, the detector means including:

means for determining the expected result;

means for receiving the controlled data stream in words; and means for transmitting error location information; and computer means for performing analysis on the error data detected by the detector means, the computer means including:

a data bus for enabling communication between the computer means and the generator means and for enabling communication between the computer means and the detector means; and means for receiving the error location information, whereby the error location information can be recorded and addressed in the computer means for analysis.

The generator means can be used to generate either a fixed or pseudo random pattern. It is this pattern which is then used to create the controlled data stream. Using the apparatus set forth above the user can select a fixed n-bit pattern or the pseudo random pattern as desired. The generator may include a linear feedback shift register to create the pseudo random patterns.

An additional feature of the apparatus in accordance with this invention is that if the user selects a fixed n-bit pattern, he can view same on a graphic display.

In the generator embodiment, the generator means may also include a separate error injector means which allows the user to inject the particular type of error desired. An example of the usefulness of this feature is given below.

It is an advantage of this invention to provide an apparatus for testing digital electronic channels which displays graphical analysis for assisting in determining the cause of errors in a tested channel.

It is an additional advantage of this invention to provide an apparatus for testing digital electronic channels which performs diagnostic operations on the controlled data stream in words based on a word rate clock.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
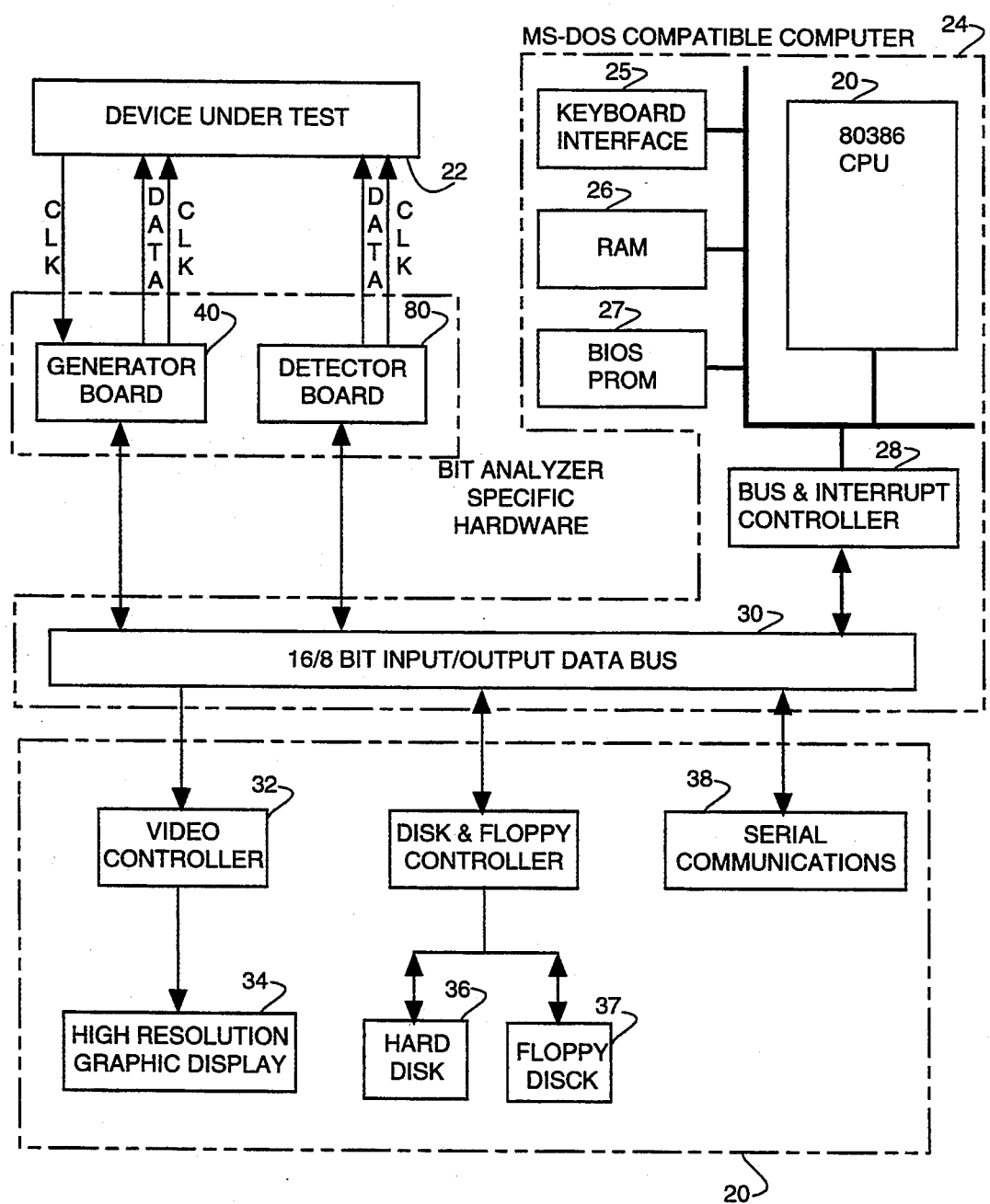
FIG. 1 is a schematic representation of the apparatus in accordance with the invention.

The invention will now be described with respect to FIG. 1 which illustrates in schematic form, the apparatus of the invention, generally designated by the numeral 20. The apparatus 20 is connected to a digital device 22 to be tested. It will be appreciated by those skilled in the art that the digital device 22 includes at least one digital channel (not illustrated). It will further be appreciated by those skilled in the art that it is the channel (or channels) which is actually under test.

The apparatus 20 includes a computer 24 which has a keyboard interface 25, random access memory (RAM) 26, a bios prom 27, and a bus and interrupt controller 28. The computer 24 includes Intel's 80386 microprocessor as its CPU 29. Other similar microprocessor such as Intel 80286, Motorola 5600X and Motorola 680X0 may also be used with expected success. The computer 24 also includes a 16 bit input/output data bus line 30 and a disk drive (not shown) being capable of being loaded with software specifically designed to cause the hardware to operate appropriately.

The apparatus 20 includes a generator board 40 which creates a controlled data stream as will be explained more fully with reference to FIG. 2. The data bus 30 connects the computer 24 and the generator board 40 and allows communication between them. For example, the computer 24 through operation of the keyboard 26, instructs the generator board 40 to create the desired controlled data stream.

A detector board 80 is connected to the device 22 for receiving data from the device 22. The detector 80 receives the controlled data stream from the device 22. The controlled data stream is in words (or in parallel). The words are typically 8 or 16 bits in length, although it is within the scope of invention to have words be of any length. The detector board 80, utilizing the software in accordance with the invention, scans the data from the device 22 and determines which predetermined pattern was used to create the controlled data stream. Upon detecting the appropriate pattern, the detector 80 compares data from the device 22 with the result expected from the pattern generated as local reference on detector board 80.

Any unexpected results are considered error events. The errors are identified and located by address in the controlled data stream and put on the data bus 30 and stored in the computer 24.

Once the detector board 80 knows the correct pattern used to create the controlled data stream, the user may select one of two modes; an on-line mode for immediate display on a high resolution graphic display 34 or a record mode which stores the data on a hard disk 36 for later analysis. Additionally, the user has a choice of different analysis that may be performed either on-line or in play mode as will be more fully appreciated hereinafter.

It will be appreciated that a data stream may be received from the device which is not a controlled data stream. For example, in another embodiment of the apparatus in accordance with this invention, there is no generator. In that embodiment, the detector simply receives a raw data stream from the device based on a test pattern within the device to be tested. The detector 80 is then set to accommodate this pattern and compare it to the expected result of this pattern.

Typically, each device under test includes one of the standard test patterns which are well known in the field. These standard test patterns are already loaded into the detector 80.

The apparatus 20 additionally includes a video controller 32 for receiving and carrying out instructions from the computer 24 on the graphic display 34. A disk controller 34 receives and carries out the instructions from the computer 24 on a hard disk 36 and floppy disk 37. The floppy disk 37 is used for off line back-up. Additionally, the floppy disk 37 may be used so that a sampling of the test results may be made and separately analyzed either locally or by shipping the diskette for off-site testing.

The apparatus 20 also includes a serial communications port 38 which allows the apparatus 20 to be connected to the device 22 in such a way that control signals through the computer 24 over the data bus 30 may be given. For example, the device under test may have no control features and the serial port can be used to send control signals such as stop, play, rewind and the like. Illustrative of this function is an Ampex DCRSi which has no play, rewind or like function. The Ampex DCRSi has only a serial port for control. The apparatus 20 can be connected to the Ampex DCRSi through the serial port 38 and controlled thereby. This saves the user the cost of an external terminal which would typically be necessary for such a device under test.

The port 38 may comprise an RS232 or an IEEE488. The serial port 38 can further be used to facilitate the sending of a data stream or a sampling thereof to an off-site location for analysis and testing through a modem or a direct link to a similar port on another computer which may be local or off-site.

Figure 2:
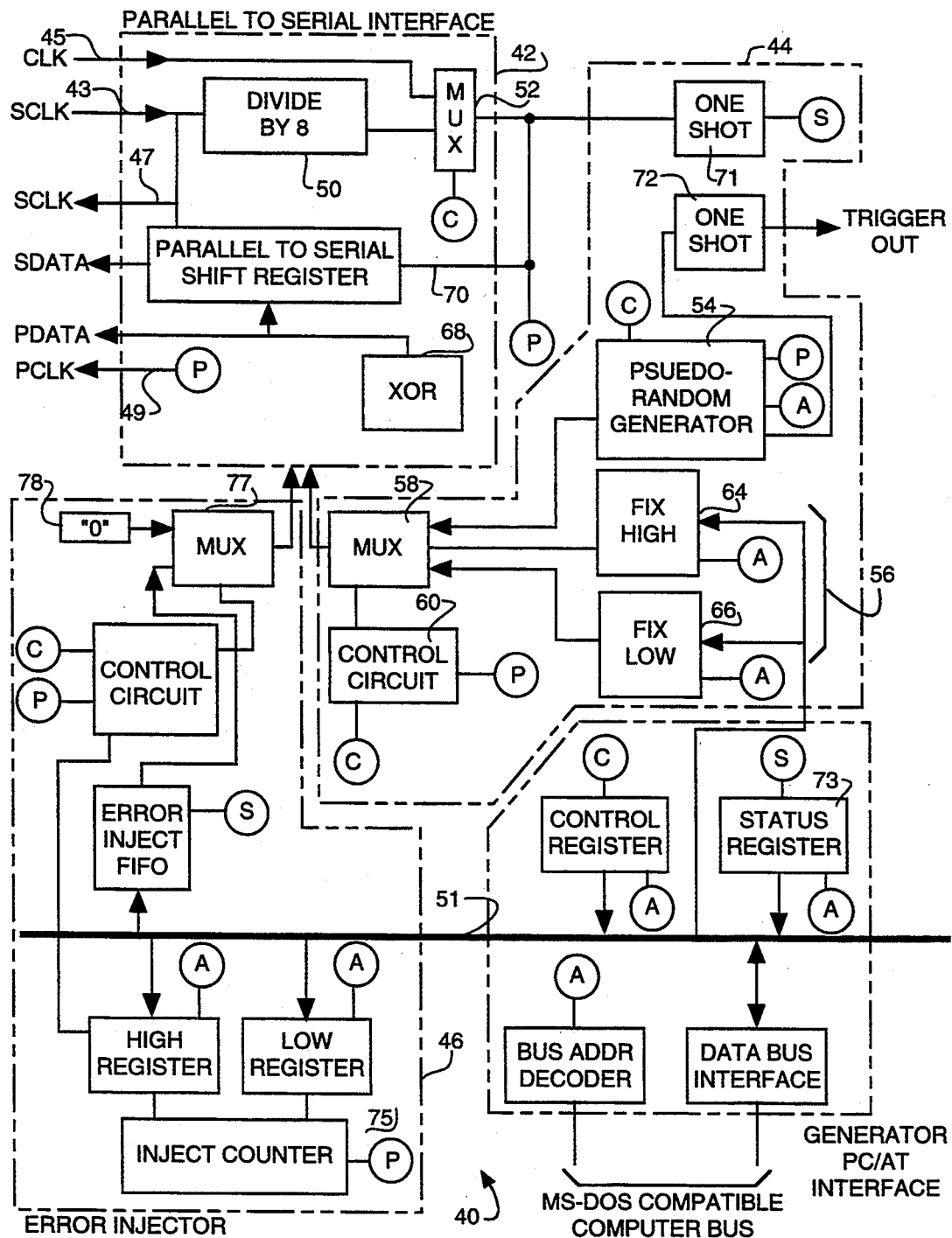
FIG. 2 is a schematic representation of the generator circuit board in accordance with the invention.

With respect to FIG. 2, there is shown the schematic representation of the generator board 40. The generator board 40 includes a pattern generator 44 which creates either a fixed or pseudo random pattern through which the controlled data stream is created.

The generator board 40 includes a parallel to serial interface 42 which accepts a clock from the device 22. It is possible for the parallel to serial interface 42 to accept either a serial or parallel clock along either line 43 or line 45, respectively. Depending upon whether the device 22 accepts serial or parallel clock, the parallel to serial interface 42 will hand off a parallel or serial clock and the controlled data stream to the device 22 over either line 47 or 49, respectively.

The generator board 40 additionally includes a generator-computer interface 48. The generator-computer interface 48 acts as the interface between the computer 24 and an internal data bus 51. The generator-computer interface 48 receives the instructions from the computer 24 and instructs the generator board 40 to carry out these instructions over the data bus 30.

An error injector 46 within the generator board 40 allows the user to inject errors into the controlled data stream as desired. Additionally, the error injector 46 may be used for testing the apparatus 20 itself by testing a solid wire and observing the results.

In operation, if data to the device 22 is to be sent in a serial fashion, a divide by 8 circuit 50 within the parallel to serial interface 42 converts the internal parallel words to serial bits. It will be appreciated that this could be a divide by n circuit where n could be any number desired within the spirit and scope of this invention. If the data stream to the device 22 is to be sent in words (in parallel) then it passes directly to a MUX 52 over line 45. Otherwise, the serial data stream passes to MUX 52 after being divided.

Upon activation of the apparatus 20, the user selects the type of pattern to be transmitted by using the keyboard 25. The computer 24 sends a control signal over line C to the pattern generator 44. The pattern generator 44 creates the controlled data stream based on the pattern selected by the user.

The pattern generator 44 includes a pseudo random generator 54 and an n-bit fixed generator shown generally by the numeral 56. A MUX 58 and a control circuit 60 within the pattern generator 44 select the appropriate source of information between the pseudo and fixed generators. The control circuit 60 is instructed by a control register 62 within the generator-computer interface 48 as to the appropriate pattern to be selected.

An n-bit fixed pattern can be selected by the user, where "n" in the preferred embodiment equals 16. However, it is possible for n to be between 1 and 32,000. Other variations of n are also within the spirit and scope of this invention.

The fixed number generator includes a fixed high register 64 and a fixed low register 66. The control register 62 sends a signal along the data bus 30 to alternate between the two registers 64 and 66 and a control signal is sent to the MUX 52 to allow only the correct fixed register signal to pass to the parallel to serial interface 42.

There are four (4) different types of pseudo-random patterns that can be generated by the pseudo random generator 54. These four patterns are based on 4 different polynomials and will be explained in detail with reference to FIGS. 6-9. Each pattern is periodic, meaning that it repeats itself. If the user has selected a pseudo random pattern, the control register 62 will contain the appropriate bits that instruct the pseudo random generator 54 to generate one of the four patterns available. The control register 62 will also instruct the control circuit 60 to signal the MUX 58 that only the signals from the pseudo random generator 54 are to pass. When the signals do pass through the MUX 58, whether from the fixed generator 56 or the pseudo random generator 54, they go to an exclusive or (XOR) gate 68 within the parallel to serial interface 42. If the device 22 accepts parallel data (words), the controlled data stream is sent directly to the parallel port of the device 22. If the device 22 only accepts serial data, the controlled data stream is converted to serial at the parallel to serial shift register 70 and then sent to the device 22.

The pattern generator 44 includes a pair of one shots, 71 and 72. The first one shot 71 is connected to the parallel clock and a status register 73 of the generator-computer interface 48. The one shot 71 detects whether a clock was found and goes high to indicate that a clock signal is present.

The second one shot 72 is connected to the pseudo random generator 54 and an external trigger. The external trigger tells the user the start of a new period of repeating pseudo random pattern. The external trigger can also be used as a synchronizing signal, for example with an oscilloscope.

The generator board 40 includes the error injector 46 which affords the capability to test the apparatus 20 with a known error profile. Thus, the performance of the user's device 22 can be determined by a given error profile. The error injector 46 includes an error inject fifo 74, an injector counter 75 having low and high registers and a control circuit 76.

The fifo 74 contains 2,048 8-bit words (or bytes) and determines the profile of the error or errors to be injected. The injector counter 75 instructs the fifo 74 when to inject its data stream to a MUX 77 within error injector 46. The control circuit 76 instructs the MUX 77 to allow the fifo's data stream to pass to the XOR 68 of the parallel to serial interface 42. In this way, the injector counter 75 determines spacing of the selected error profile.

The error injector 46 also includes a "0" circuit 78. The "0" circuit continually sends a low or "0" signal to the MUX 77. When the error injector 46 is turned off, no errors are desired to be injected. The MUX 77 is instructed to allow the low signal to pass to the XOR gate 68, thus leaving the controlled data stream uncorrupted.

Figure 3:
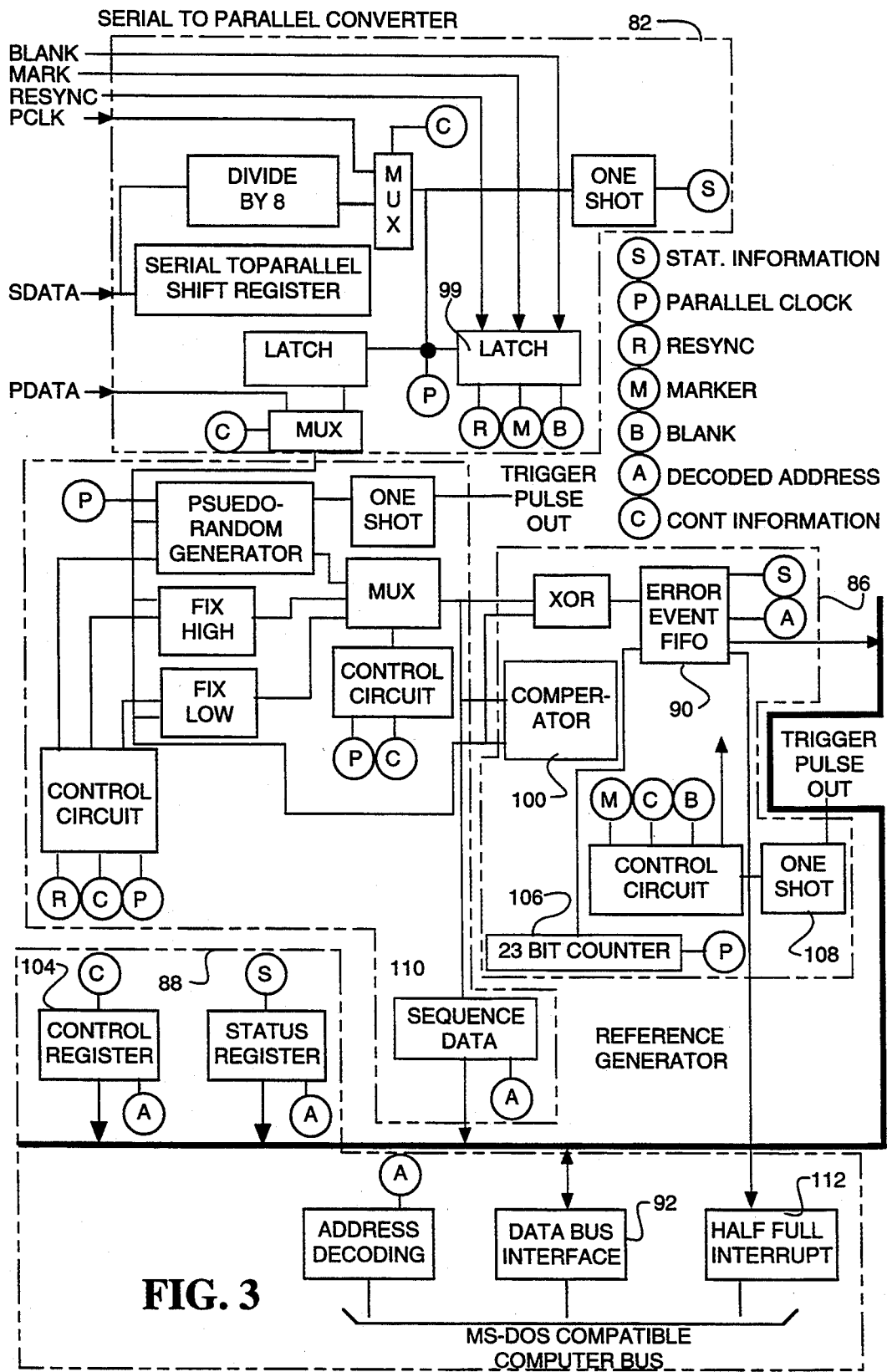
FIG. 3 is a schematic representation of the detector circuit board in accordance with the invention.

With respect to FIG. 3, there is shown the schematic representation of the detector board 80. The detector board 80 is connected to the device 22 either in a parallel word or serial bit fashion. The detector board 80 compares the controlled data stream from the device 22 to an expected result and lists the unexpected results as error events.

The error events may be bit errors or burst errors. Bit errors are errors which are shorter than the minimum length that the user desires to attribute to a burst. These may be set arbitrarily by the user or by default of the apparatus 20. Burst errors are the remaining errors. Error lengths are determined by the spacing of the error bits. If the spacing between error bits is less than the user specified minimum error free interval (EFI), the error length is said to span the entire interval. Again the user may set the minimum EFI to a desired length arbitrarily or leave it to the default of the apparatus 20. Burst errors are also counted as single error events.

Typically, the user will set the minimum burst length to a large number if he desires to isolate large bursts and to a small number if he desires to isolate small bursts. Typically, the user will set the EFI to 11 because he desires to receive information about both large and small bursts and often will set the EFI to 1 to isolate single bit errors.

The detector board 80 includes a serial to parallel converter 82, a reference generator 84, an error logging member 86 and a detector-computer interface 88. The serial to parallel converter 82 receives the controlled data stream from the device 22 and if necessary converts the controlled data stream to parallel before passing the controlled data stream to the reference generator 84.

The reference generator 84 matches the pattern used for creating the controlled data stream in a manner which will be explained more fully hereinafter with respect to the detailed description of the reference generator 84. Once the pattern of the controlled data stream is matched by the reference generator 84, the controlled data stream is read into the detector board 80 and compared with the pattern in the reference generator 84 at the error logging member 86.

Each time an unexpected result is observed by the error logging member 86, the location information is sent to a fifo memory 90 within the error logging member 86. The location information is stored in the fifo memory 90 and then sent to the detector-computer interface 88 at the appropriate time. A data bus interface 92 within the detector-computer interface 88 receives the location information from the fifo memory 90 and upon an appropriate instruction from a control circuit 104 within the error logging member 86 sends the location information to the computer 24 along the data bus 30.

The serial to parallel converter 82 includes a divide by n circuit, which in the preferred embodiment is a divide by 8 circuit attached to a one shot for detecting whether or not a clock is present, a serial to parallel converter element 97 for receiving the serial clock and data of the device 22, and parallel latching register 98 for holding the serial to parallel converted data from the device 22. Blank, marker, and resync signals are received by the serial to parallel converter 82 and entered into a second latch 99.

The reference generator 84 is virtually identical to the pattern generator 44. And the reference generator 84 includes the same elements for generating either a fixed or pseudo-random pattern as the pattern generator 44. The reference generator 84 accepts a sampling of data or a seed from the controlled data stream in the form of 3 8-bit words to initialize the reference generator 84 and start its operation. The reference generator 84 then generates a first pattern. It will be appreciated that the first reference pattern generated could be any of the patterns which the apparatus is capable of generating. Thus a fixed or pseudo random pattern could be generated first. Each succeeding pattern is then generated until the pattern in the controlled data stream is matched.

Simultaneously, the controlled data stream is passed through the reference generator 84 to a comparator 100 within the error logging member 86. The comparator 100 compares the controlled data stream to the reference generator's generated pattern. The comparator 100 is a series of XOR gates linked together by a NOR gate (not shown). Each time the comparator detects a difference between the pattern generated by the reference generator 84 and the controlled data stream a high signal or "one" is sent to the control circuit which in turn registers an error event in the error event fifo memory 90. It will be appreciated that an OR gate could also be used and a low signal would be generated with the same results.

After a short period of time enough words will have been compared that the error event fifo memory 90 will have either overflowed or the pattern will have been matched. In the preferred embodiment, the error event fifo memory 90 comprises a 64K bit fifo RAM. Four bytes of data are held in the error event fifo memory 90 for each error event. Thus, if the pattern does not match the memory will quickly overflow and a signal will be sent to the detector-computer interface 88. Upon receipt of the overflow signal, the computer 24 instructs the control circuit 60 to sequence to the next pattern. If the error event fifo memory 90 does not overflow, then a match has been found and the comparison of the controlled data stream to the reference pattern continues.

It will be appreciated by those skilled in the art that a bit stream having a data rate considerably faster than the general purpose processing power of the CPU 29 can be analyzed by the device 20 in accordance with this invention, only because the actual number of errors is typically quite small.

The error logging member 86 includes a 23 bit counter 106 which records the location of each error event as it is sent to the error event fifo memory 90.

There are three separate types of error events. The first has been described above, namely an error event in the controlled data stream. The second is when there is a transition on the marker signal. The marker is used for Modulo marker analysis as will be explained more fully below. The third error event occurs when the 23 bit counter 106 rolls over.

The error logging member 86 further includes a one shot 108 connected to an outside trigger which signals high each time an error event is recorded. This enables the viewer to see when his controlled data stream is having many errors. In a worst case analysis, where there are too many errors for the apparatus 20 to analyze, choking occurs as will be explained more fully with reference to FIG. 4. This means that there are too many errors for the apparatus to process at the given data rate. The apparatus 20 cuts off and no processing is done. However, the external trigger continues to indicate errors. Should the number of errors diminish to the point where processing can be performed, the user can again begin either on-line analysis or start storing the data in the record mode.

The reference generator 84 includes a sequence data member 110 which is used to read the value of the data that is being generated by the reference generator. This is used in diagnostic modes for checking reference generator operation and for reading the 16 bit fixed pattern, if the same is detected. Also, if a fixed pattern is detected in the controlled data stream, the pattern value is displayed on the graphic display 34.

The error event fifo memory 90 includes a pin (not shown) that signals when the fifo memory 90 is half full. This pin is connected to a half full interrupt 112 within the detector-computer interface 88. When the error event fifo memory 90 signals that it is half full, the half full interrupt 112 sends a signal to the computer which causes the error event fifo memory 90 to dump its contents on the internal bus 81 which in turn transports the data to the data bus interface 92 for storage in the computer 24 memory.

The control circuit 104 receives the marker and blank signals from the second latch 99. If there is a blank signal, the comparator 100 is instructed to ignore any differences between the controlled data stream and the reference pattern. Thus, if there is a blank signal, no error event is recorded to the error event fifo memory 90. At various times the user may know that the controlled data stream will have excessive errors during a portion of the data stream, but may still wish to have the remaining portion of the controlled data stream analyzed. The user would insert a blanking signal during that portion of the controlled data stream and continue the analysis on the remaining portion of the controlled data stream.

For example, when a multiple head tape deck is to be tested, in an unformatted application a great deal of noise will be generated during the time the heads are switching due to rotation. The user inserts a blanking signal during the head changing period to eliminate meaningless errors on the controlled data stream.

The resync signal is stored in the second latch 99 and then appropriately transmitted to the control circuit 60. The resync signal is used to re-seed the pattern generators within the reference generator 84. For example, after the head switch described above, the controlled data stream will fall out of sync with respect to the reference generated pattern. This will cause the error event fifo memory 90 to eventually overflow and cause the computer to issue an instruction for re-seeding. Instead of waiting for the error event fifo memory 90 to indirectly cause an overflow and hence a resync, the resync signal can be explicitly set high to cause the process of re-seeding and synchronizing to be done much earlier allowing more user-data to be analyzed.

The detector-computer interface 88 includes control and status registers 94 and 102 which are used during initialization and operation of the detector board 80.

Figure 4:
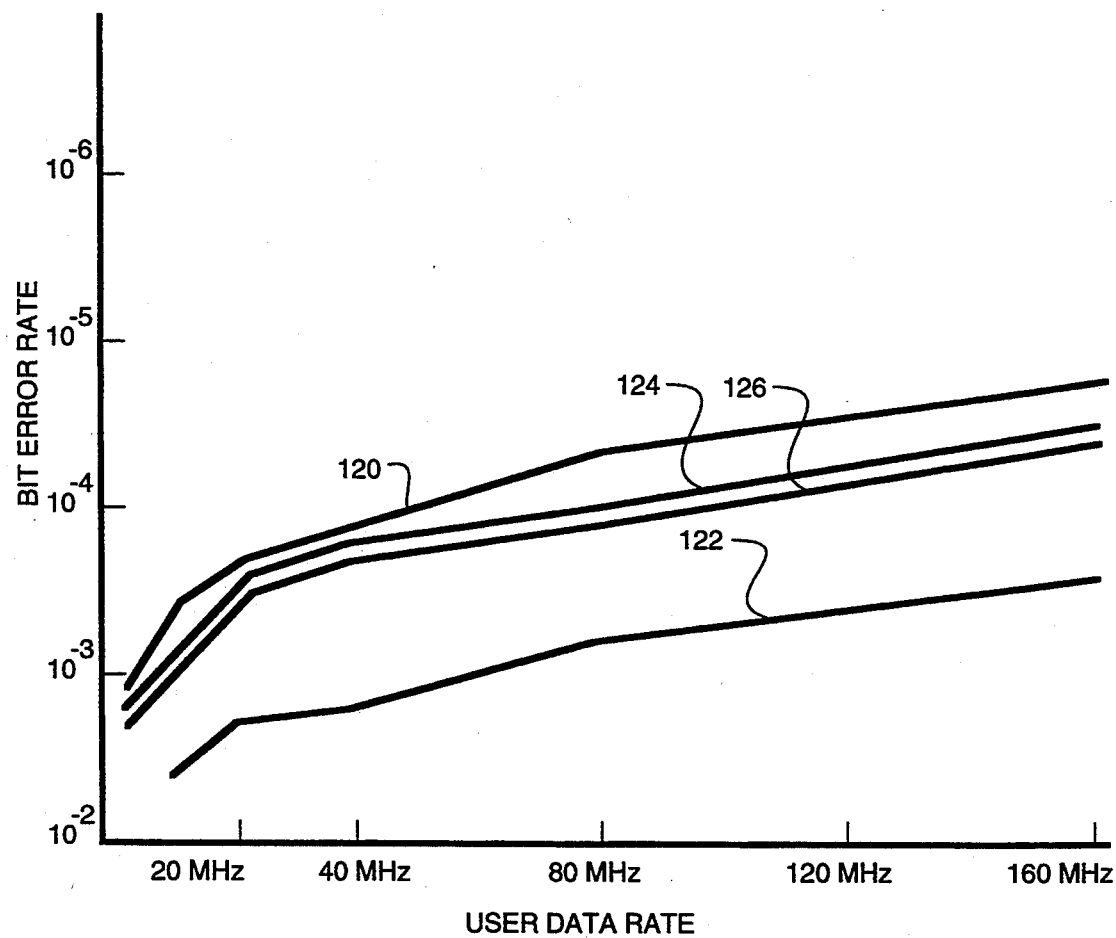
FIG. 4 is a graphical representation of the minimum channel performance characteristics necessary to activate the apparatus in accordance with the invention.

With respect to FIG. 4, there is shown the graphic representation of the maximum error rates that can be handled by the device 22 for a given data rate for a given mode or analysis type. The level at which the device 22 cuts off the analysis is defined as the "Choke" level and FIG. 4 represents the Choke Analysis. It will be appreciated that the Bit Error Rate decreases as the further from the origin it gets and the User Data Rate increases as it gets further from the origin.

The user can select between two modes, on-line and record as discussed above. In the on-line analysis, the graphic display 34 immediately starts to display the measurements made by the device 22. In the record mode, the data is recorded to the hard disk 36 for later analysis and display. The user can also select between various types of analysis including Modulo Analysis, Strip Chart Analysis and Bit Error Rate Analysis.

In FIG. 4, line 120 represents the On-line Modulo Analysis Choke line. At any data rate where the number of errors is below line 120, the device 20 in accordance with the invention will not perform on-line Modulo Analysis. However, if the bit error rate for a given data rate is below the line 120 but above the Record Mode Choke line, line 122, the analysis can be done off-line and later displayed on the graphic display 34. Line 124 represents the On Line Strip Chart Analysis Choke line and line 126 represents the On Line Bit Error Rate Choke line.

Figure 5:
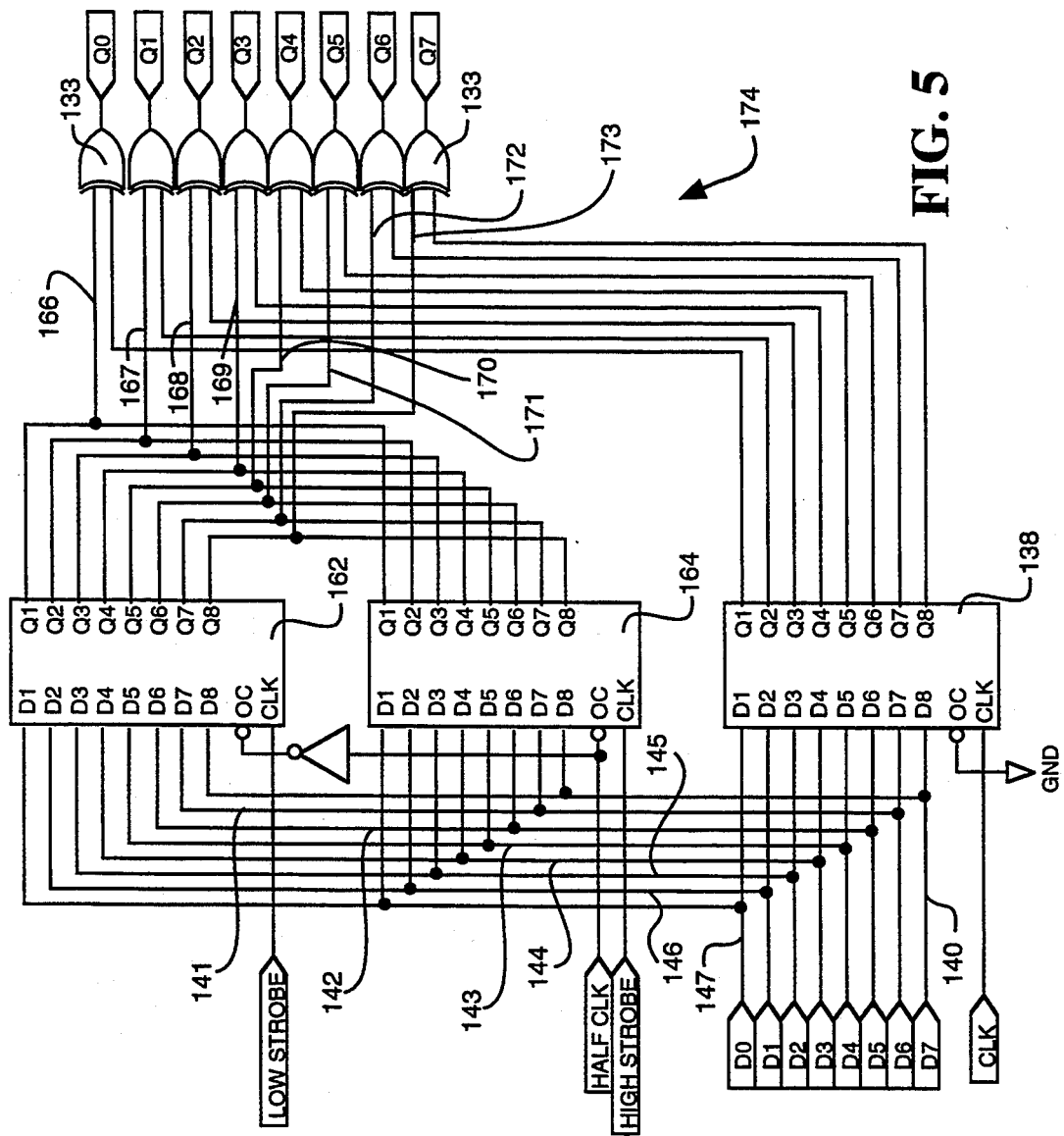
FIGS. 5, 6, 7, 8 and 9 are circuit schematics for the pseudo random and fixed bit number generation in accordance with the invention.

With respect to FIG. 5, there is shown the circuit schematic of a fixed pattern detector generally indicated by the numeral 160. The fixed pattern detector 160 is the same as the fixed pattern generator 56 with the exception that the comparison circuitry shown in FIG. 10 and described below is not present. The fixed pattern detector 160 includes registers 162 and register 164. The fixed pattern detector 160 detects a 16-bit fixed pattern of any length. Two consecutive 8-bit bytes (a total of 16 bits) are taken from the data stream under test through input lines 140 through 147. Alternatively, the two bytes are latched into registers 162 and 164. By alternating the outputs of these registers, 162 and 164, unto lines 166 through 173, the fixed 16 bit sequence is constantly regenerated for comparison by the XOR gates 133 with the data stream under test. If any output from the XOR gates 133 is logic high, then an error is detected.

The comparison circuitry generally indicated by the numeral 174 includes the register 138 and XOR gates 133 which detects mismatches between the fixed pattern under test (user's data) and the fixed pattern generated by the registers 162 and 164.

With respect to FIGS. 6 through 9, there is shown the circuit schematic for each of the four pseudo-random patterns that can be generated by the device 22. FIGS. 6 through 9 each represent schematics of linear feedback shift registers. The pseudo random generator 54 generates one of four pseudo random patterns depending upon which linear feedback shift register is chosen.

Figure 6:
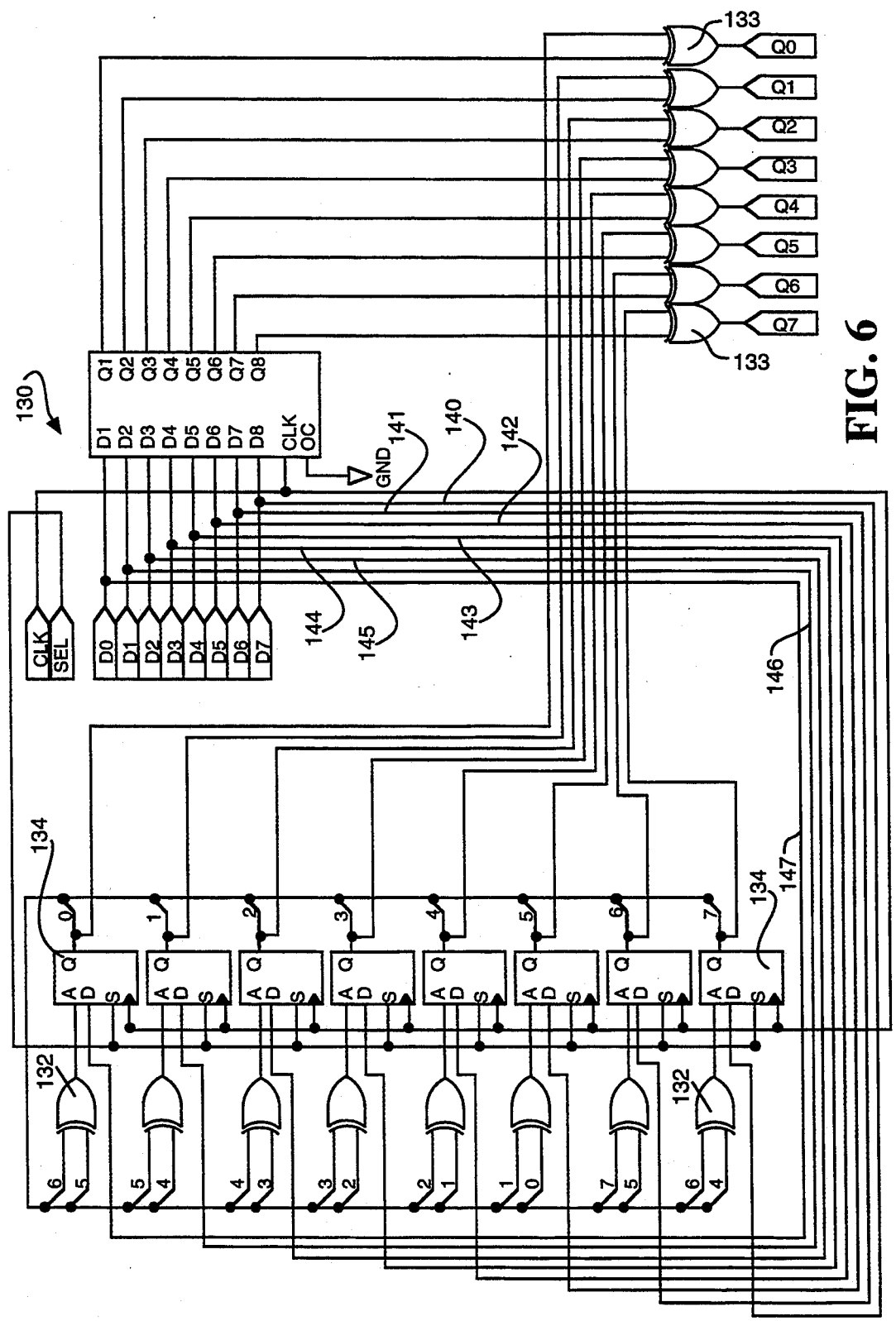

FIG. 6 represents, in circuit schematic, the $2^7-1$ polynomial which is generally designated by the numeral 130 and defines a linear feedback shift register. The linear feedback shift register 130 comprises a series of 8 XOR input gates 132 and 8 XOR output gates 133. The series of 8 XOR input gates are connected to 8 registers 134. The registers 134 are all tied to a clock line 136 which is connected to device 22 divide by 8 clock. Input lines 140, 141, 142, 143, 144, 145, 146 and 147 are connected to the 8 input XOR gates 132 as shown.

The registers are seeded by explicit command from the computer upon the start of operation or by an external resync operation. After seeding the contents of the 8 registers are fed back through the appropriate XOR gates to the inputs of the registers so as to create a new set of outputs when the next clock pulse occurs. This process is repeated for every rising edge of the divide by 8 user clock.

Figure 7:
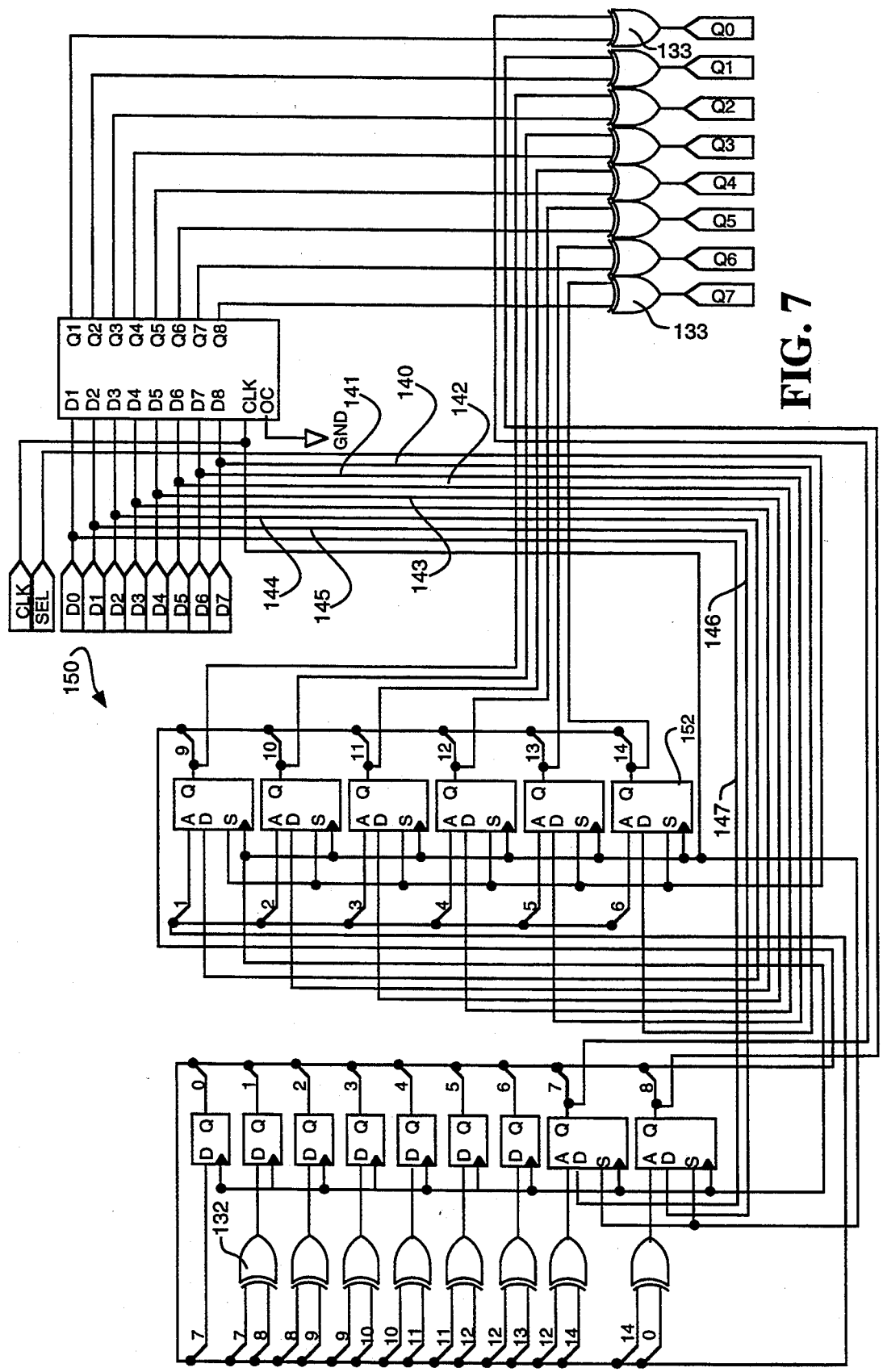

FIG. 7 represents, in circuit schematic, the $2^{15}-1$ polynomial which is generally designated by the numeral 150. As seen from the drawing, this second polynomial is of an identical construction to the first polynomial 130 and works in a substantially similar manner. However, the second polynomial includes additional registers 152 which are also used to hold information form state to state between clock edges when generating the pseudo random bit sequence. It will also be seen that the data word formed on the output XOR gates 133 is taken from the last 8 registers.

Figure 8:
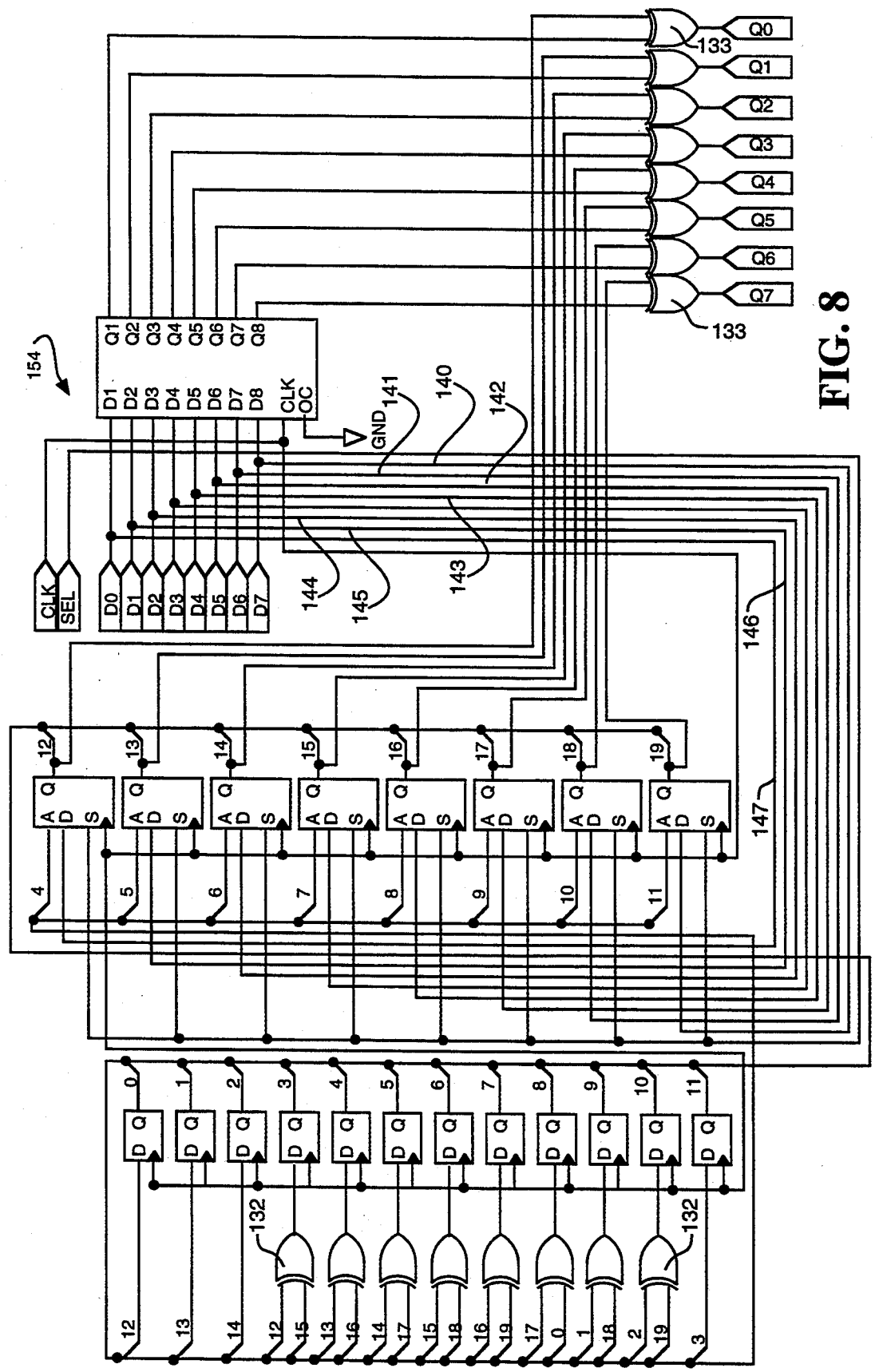

FIG. 8 represents, in circuit schematic, the $2^{20}-1$ polynomial (the third polynomial) which is generally designated by the numeral 154. The third polynomial 154 is of the same general construction as the first and second polynomials, 130 and 150, respectively. However, the third polynomial includes 20 registers where the first polynomial includes 8 and the second polynomial includes 15.

Figure 9:
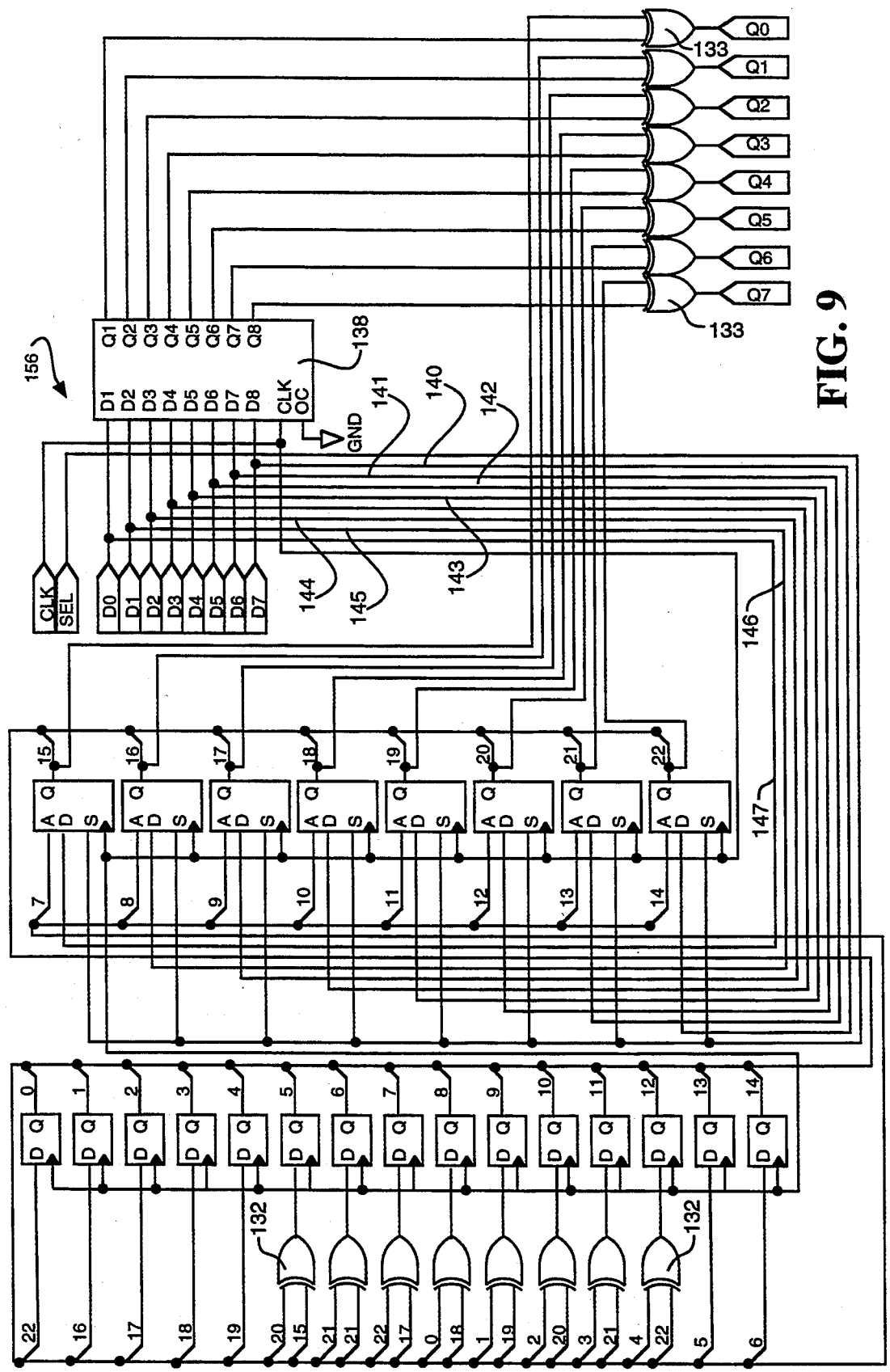

FIG. 9 represents, in circuit schematic, the $2^{23}-1$ polynomial (the fourth polynomial) which is generally designated by the numeral 156. The fourth polynomial 156 is of the same general construction as the first, second and third polynomials, 130, 150 and 154, respectively. However, the fourth polynomial includes 23 registers where the first polynomial includes 8, the second polynomial includes 15 and the third includes 20.

The different polynomials allow the user to exercise different aspects of their designs. Pseudo-random sequences generated by small polynomials have little low frequency components whereas sequences generated by long polynomials has substantial low frequency components. Different frequency components in the controlled data stream may be used to spot different failure modes or idiosyncracies of the device 22.

While the foregoing detailed description has described several embodiments of the apparatus for testing digital electronic circuits in accordance with this invention, it is to be understood that the above description is illustrative only and not limiting of the disclosed invention. Particularly, the apparatus of the invention has been described with respect to certain patterns for creating a controlled data stream. It will be appreciated that these patterns can vary from the ones described within the scope and spirit of this invention. Thus the invention is to be limited only by the claims as set forth below.

What is claimed is:

1. An apparatus for testing a digital electronic channel which communicates data in words, comprising:

detector means for receiving a data stream from the electronic channel under test in words, the detector means including means for comparing the data stream from the channel under test to an expected result and identifying and locating errors by their address in the data stream and means for transmitting error address location information; and computer means for performing analysis on the error data detected by the detector means and the computer means including means for receiving the error location information and a data bus for enabling communication and control between the computer means and the detector means, whereby error location information can be recorded and addressed for analysis.

2. An apparatus for testing a digital electronic channel which communicates data in serial or parallel, comprising:

detector means for receiving a data stream from the electronic channel under test in words, the detector means including:

means for converting a serial data stream from the channel under test to parallel; and means for comparing the data stream from the channel under test to an expected result and identifying and locating errors in the data stream and means for transmitting error location information; and computer means for performing analysis on the error data detected by the detector means and the computer means including means for receiving the error location information and a data bus for enabling communication and control between the computer means and the detector means, whereby error location information can be recorded and addressed for analysis.

3. An apparatus for testing a digital electronic channel which communicates data, comprising:

generator means adapted for connection to the channel under test for generating a controlled data stream and means for generating the controlled data stream in words and for transmitting the controlled data stream to the channel under test;

detector means adapted for connection to the channel under test for identifying and locating errors by their address in the controlled data stream by comparing the controlled data stream to an expected result, wherein the unexpected results are known as errors, the detector means including:

means for determining the expected result;

means for receiving the controlled data stream in words; and computer means for performing analysis on the error data detected by the detector means, the computer means including:
- a data bus for enabling communication between the computer means and the generator means and for enabling communication between the computer means and the detector means; and
- means for receiving the error location information, whereby the error location information can be recorded and addressed in the computer means for analysis.

4. An apparatus for testing a digital electronic channel as set forth in claim 3, wherein the generator means includes means for injecting predetermined error into the controlled data stream.

5. An apparatus for testing a digital electronic channel as set forth in claim 3, wherein the detector means receives the controlled data stream in words only.

6. An apparatus for testing a digital electronic channel as set forth in claim 3, wherein the detector means transmits only errors.

7. An apparatus for testing a digital electronic channel as set forth in claim 3, wherein the means for determining the expected result comprises means for scanning the controlled data stream and comparing the controlled data stream to all known patterns and selecting the correct pattern for comparison.

8. An apparatus for testing a digital electronic channel as set forth in claim 3, wherein the controlled data stream comprises a pattern which is periodic.

9. An apparatus for testing a digital electronic channel as set forth in claim 8, wherein the pseudo random pattern can be selected from a group of pseudo random patterns of different periodicity.

10. An apparatus for testing a digital electronic channel as set forth in claim 8, wherein the generator means includes a linear feedback shift register for generating a controlled data stream comprising a pseudo random pattern.

11. An apparatus for testing a digital electronic channel as set forth in claim 10, wherein the linear feedback shift register creates the pseudo random pattern in n length bit words, where n is an integer.

12. An apparatus for testing a digital electronic channel as set forth in claim 8, wherein the controlled data stream comprises a n bit fixed pattern, where n is an integer.

13. An apparatus for testing a digital electronic channel as set forth in claim 12, wherein the n bit fixed pattern is selectable.

14. An apparatus for testing a digital electronic channel as set forth in claim 3, wherein the computer means includes storage means for storing each error location information.

15. An apparatus for testing a digital electronic channel as set forth in claim 14, wherein the computer means includes graphic displays for displaying the errors.

16. An apparatus for testing a digital electronic channel as set forth in claim 14, wherein the computer means includes means for performing statistical analysis on the stored error location information.

17. An apparatus for testing a digital electronic channel as set forth in claim 16, wherein the statistical analysis is performed using a marker placed at predetermined locations.

18. An apparatus for testing a digital electronic channel as set forth in claim 17, wherein the statistical analysis displays an n-bit wide distribution of errors, where the number of bits between markers determines n.

19. An apparatus for testing a digital electronic channel as set forth in claim 17, wherein the statistical analysis displays an n-bit wide distribution of errors, where n is a positive integer.

20. An apparatus for testing a digital electronic channel as set forth in claim 19, where n is selectable.

* * * * *

UNITED STATES PATENT AND TRADEMARK OFFICE
CERTIFICATE OF CORRECTION

PATENT NO. : 5,414,713
DATED : May 9, 1995
INVENTOR(S) : Thomas E. Waschura, et al It is certified that error appears in the above-indentified patent and that said Letters Patent is hereby corrected as shown below:

On the Title Page, Item [73], "Synthesis Research, Inc." should read —SyntheSys Research, Inc.—.

Signed and Sealed this

Sixteenth Day of January, 1996

BRUCE LEHMAN

Attest:

Attesting Officer

Commissioner of Patents and Trademarks